United States Patent [19]

Nielinger et al.

[11] Patent Number: 4,719,284
[45] Date of Patent: Jan. 12, 1988

[54] MULTISTAGE PROCESS FOR THE PREPARATION OF POLY(TETRAMETHYLENE-ADIPAMIDE)

[75] Inventors: Werner Nielinger; Hermann Brinkmeyer; Rudolf Binsack; Ludwig Bottenbruch, all of Krefeld; Heinz-Josef Füllmann, Leichlingen, all of Fed. Rep. of Germany

[73] Assignee: Bayer Aktiengesellschaft, Leverkusen, Fed. Rep. of Germany

[21] Appl. No.: 886,061

[22] Filed: Jul. 16, 1986

[30] Foreign Application Priority Data

Jul. 27, 1985 [DE] Fed. Rep. of Germany ....... 3526931

[51] Int. Cl.$^4$ .............................................. C08G 69/28
[52] U.S. Cl. ................................... 528/335; 528/336; 528/338; 528/339; 528/340
[58] Field of Search ............... 528/335, 336, 338, 339, 528/340

[56] References Cited

U.S. PATENT DOCUMENTS 4,408,036  10/1983  Gaymans et al. ................... 528/335
4,446,304   5/1984  Gaymans et al. ................... 528/335
4,460,762   7/1984  Gaymans et al. ................... 528/335

FOREIGN PATENT DOCUMENTS 0039524  3/1981  European Pat. Off. .

*Primary Examiner*—Harold D. Anderson
*Attorney, Agent, or Firm*—Connolly & Hutz

[57] ABSTRACT

Process for the preparation of polyamides from 1,4-diaminobutane and adipic acid, wherein a 40 to 70% strength aqueous solution of the monomers is heated at 280°–320° C., preferably 290°–310° C., for a period of 5 to 30 minutes under a pressure of less than 8 bar, to give a precondensate having a relative viscosity of 1.05 to 2.0, and solid phase after-condensation at 180°–260° C.

10 Claims, No Drawings

MULTISTAGE PROCESS FOR THE PREPARATION OF POLY(TETRAMETHYLENE-ADIPAMIDE)

The invention relates to a process for the preparation of poly(tetramethyleneadipamide) by heating the salt formed from 1,4-diaminobutane and adipic acid at 260°-310° C. under less than 8 bar, and subjecting the precondensate to further condensation in the solid phase.

The preparation of polyamides from 1,4-diaminobutane and adipic acid is associated with considerable difficulties. Thus, according to J. Polym. Sci, Pol. Chem, 15, 539 (1977), a colourless precondensate is obtained by precondensation of 1,4-diaminobutane and adipic acid under 20-40 bar, but this precondensate becomes discoloured when subjected to further condensation in vacuo at 290° C.

European Patent Specification No. 39,524 teaches an improvement in the process. The pre-condensation is carried out at a temperature of not more than 220° C. In the course of this, the melt is kept in the liquid state by means of a steam pressure of 20-25 bar. Deviating from the prescribed conditions, in particular carrying out the precondensation at temperatures above 220° C., results in discoloured products and in an increase in the formation of pyrrolidine end groups from 1,4-diaminobutane, which interfere with the after-condensation. It is also necessary to carry out the after-condensation of these precondensates in the presence of steam, in order to obtain end products of a pale colour.

It has now been found that pale polyamides are obtained in a simple manner if the pre-condensation is carried out continuously at temperatures between 260° and 310° C. under an only slightly increased pressure, with a reaction time which should not exceed 30 minutes; this gives precondensates having less than 0.1% by weight pyrrolidine end groups compared with more than 0.13% by weight in accordance with the known processes. The precondensates can be subjected to after-condensation to give polyamides of pale colour, without the addition of steam. Precondensates which can be subjected to after-condensation at temperatures as low as 180°-220° C. in a stream of nitrogen and without added steam to give virtually colourless polyamides can, however, also be prepared discontinuously on a small scale under atmospheric pressure by heating at most to 220° C. (bath temperature) and subsequently at 280°-320° C., preferably 290°-310° C.

The invention therefore relates to a process for the preparation of polyamides from 1,4-diaminobutane and adipic acid by heating a 40-70% strength aqueous solution of the salt formed from 1,4-diaminobutane and adipic acid at 280°-320° C., preferably 290°-310° C., for a period of 5-30 minutes and under a pressure of less than 8 bar, preferably 1-5 bar, and then subjecting the precondensate, which has a viscosity of 1.05-2.0, preferably 1.1-1.5, to after-condensation at 180°-260° C., preferably 200°-250° C.°C. in the solid phase, preferably under a stream of nitrogen and without the addition of steam.

A device such as is described in British Patent Specification No. 924,630 is, for example, suitable for the preparation of the precondensate.

The process is preferably carried out continuously.

In addition to 1,4-diaminobutane and adipic acid, it is also possible to condensate other amide-forming monomers in amounts of up to 20 mol%, preferably up to 10 mol%, relative to the diamine of the dicarboxylic acid. Suitable comonomers are ω-aminocarboxylic acids, such as ε-aminocaproic acid, ω-aminoundecanoic acid or ω-aminolauric acid, and also dicarboxylic acids, such as azelaic acid, sebacic acid, decanedicarboxylic acid, cyclohexanedicarboxylic acid, terephthalic acid and isophthalic acid, and diamines, such as hexamethylenediamine, trimethylhexamethylenediamine, bis-(4-aminocyclohexyl)-methane, 3,3'-dimethyl-4,4'-diaminodicyclohexylmethane or xylylenediamine. The comonomers can be added each alone or as a mixture, provided that substantial equivalence of the functional groups is maintained.

This is because diamines and dicarboxylic acids should, in principle, be employed in equivalent amounts. However, it is advisable to use an excess of 0.1 to 10 mol%, preferably 1 to 8 mol%, of 1,4-diaminobutane in order to compensate for losses occurring in the precondensation.

After the pre-condensation or after the further condensation in the solid phase, it is possible to add to the products prepared by the process according to the invention the customary additives and auxiliaries, such as lubricants and mould release agents, nucleating agents and stabilizers, and also fire-retarding agents and fillers, in particular glass fibres in amounts of 10-60% by weight, relative to the whole mixture. Further suitable fillers and reinforcing materials are glass microspheres, chalk, quartzes, such as novaculite, and silicates, such as asbestos, feldspar, mica, talc, wollastonite and kaolin in a calcined and non-calcined form. Mention should also be made of dyestuffs and pigments, in particular carbon black and/or nigrosine bases, and also toughening modifiers, for example those based on copolymers of ethylene, grafted polybutadienes and poly(meth)acrylates.

The polyamides can be processed on commercially available injection moulding machines or extruders. Mouldings such as injection mouldings or panels, can be produced from them for machine construction, for industrial equipment, for automobile construction and for the electrical industry. Mouldings composed of the polyamides according to the invention can be employed with particular advantage in cases where a fairly high heat distortion point is required.

EXAMPLE 1

A 60% strength aqueous solution of the salt of 1,4-diaminobutane and adipic acid, containing a 5 mol% excess of 1,4-diaminobutane is pumped from a vessel heated at 80° C. through a coiled pipe of length 4 m and diameter 4 mm which is heated at 300° C. by oil. The throughput is 8 ml of salt solution per minute. At the end of the pipe there is a Hofer valve which is so regulated that a pressure of 1.5 bar is measured at the end of the pipe. The emergent melt is collected in water and cooled. The colourless precondensate has a relative viscosity of 1.22, measured on a 1% strength solution in m-cresol at 25° C. in an Ubbelohde viscometer.

End groups: $NH_2$, 0.112% by weight; COOH, 1.96% by weight.

Pyrrolidine content: 0.06% by weight

The pyrrolidine content was determined as specified in European Patent Application No. 38094.

The precondensate was subjected to after-condensation for 24 hours at 250° C. in a stream of nitrogen. The product of after-condensation has a slightly yellow colour; it has a relative viscosity of 3.86, measured as indicated above.

EXAMPLE 2

Example 1 is repeated, but in this test the coiled pipe is extended from 4 m to 6 m. The pressure set up in the pipe is 2.5 bar.

This gives a precondensate having a relative viscosity of 1.17, and this was subjected to after-condensation for 17 hours at 250° C. in a stream of nitrogen to give a polyamide having a relative viscosity of 2.8.

EXAMPLE 3

The advantages of polycondensation under a low pressure and a high temperature are shown by the following example: 93.7 g of the salt formed from 1,4-diaminobutane and adipic acid containing an excess of 0.7 g (2%, relative to the diamine) of 1,4-diaminobutane are heated in a round-bottomed flask, with stirring and in an atmosphere of nitrogen, by means of an oil bath at 220° C. The melt solidifies after 30 minutes; the bath temperature is then raised to 300° C. The product melts again; the test is terminated after a further 5 minutes.

The precondensate has a relative viscosity of 1.95. It is subjected to after-condensation for 24 hours at 200° C. in a stream of nitrogen to give a polyamide which has a viscosity of 3.10 and is pale.

We claim:

1. A process for the production of polyamide from 1,4-diaminobutane monomer and adipic acid monomer, wherein a 40 to 70% strength aqueous solution of the monomers is heated at 280° to 320° C. for a period of 5 to 30 minutes under a pressure of less than 8 bar to give a precondensate having a relative viscosity of 1.05 to 2.0 as measured on a 1% strength solution in m-cresol at 25° C. and thereafter condensing the precondensate at 180° to 260° C.

2. A process according to claim 1, wherein the solution of the monomers is heated at 290° to 310° C.

3. A process according to claim 1, wherein the solution of the monomers is heated under a pressure of 1 to 5 bar.

4. A process according to claim 1, wherein the reaction is carried out to give a precondensate having a relative viscosity of 1.1 to 1.5.

5. A process according to claim 1, wherein the after-condensation is carried out at 200° to 250° C.

6. A process according to claim 1, wherein the process is carried our continuously.

7. A process according to claim 1, wherein the precondensation is carried out under steam and the after-condensation is carried out without the addtion of steam.

8. A process as claimed in claim 1, wherein the process is carried out discontinuously and the aqueous solution is first heated to at most 220° C. and then to 280° C.

9. A process according to claim 1, wherein up to 20 mol % of a comonomer are cocondensed.

10. A process according to claim 9, wherein the comonomer is at least one ω-aminocarboxylic acid, dicarboxylic acid other than adipic acid, or diamine other than 1,4-diaminobutane.

* * * * *